(12) United States Patent
Kendall (10) Patent No.: US 7,580,408 B2
(45) Date of Patent: *Aug. 25, 2009

(54) CONFIGURABLE PACKET PROCESSOR

(75) Inventor: Chad William Kendall, Vancouver (CA)

(73) Assignee: Alcatel Lucent, Paris (FR)

( * ) Notice: Subject to any disclaimer, the term of this patent is extended or adjusted under 35 U.S.C. 154(b) by 826 days.

This patent is subject to a terminal disclaimer.

(21) Appl. No.: 10/465,236

(22) Filed: Jun. 20, 2003

(65) Prior Publication Data

US 2003/0210702 A1    Nov. 13, 2003

Related U.S. Application Data

(63) Continuation-in-part of application No. 09/988,939, filed on Nov. 21, 2001, now Pat. No. 7,236,492.

(51) Int. Cl.
*H04L 12/28* (2006.01)

(52) U.S. Cl. ........................ 370/392; 370/394

(58) Field of Classification Search ............... None
See application file for complete search history.

(56) References Cited

U.S. PATENT DOCUMENTS

| 4,215,402 | A | * | 7/1980 | Mitchell et al. | 711/216 |
| 4,985,920 | A | * | 1/1991 | Seki | 713/193 |
| 6,289,414 | B1 | * | 9/2001 | Feldmeier et al. | 711/108 |
| 6,775,284 | B1 | * | 8/2004 | Calvignac et al. | 370/392 |
| 6,904,057 | B2 | * | 6/2005 | Sarkinen et al. | 370/469 |
| 7,002,965 | B1 | * | 2/2006 | Cheriton | 370/395.32 |
| 2002/0163935 | A1 | * | 11/2002 | Paatela et al. | 370/466 |
| 2004/0208122 | A1 | * | 10/2004 | McDysan | 370/230 |

FOREIGN PATENT DOCUMENTS

EP    1 315 357 A2  *  5/2003

* cited by examiner

*Primary Examiner*—Robert W Wilson (57) ABSTRACT

A packet processing device has an on-board match engine memory. Actions to be taken on a packet can be looked up in the match engine memory using a key comprising a match engine index and a protocol field from the packet. The match engine index is obtained from either a relatively small on-board parser memory or a larger context memory. The parser memory contains match engine indices for sparse protocols. Performance approaching that of hard-wired packet processors can be obtained. New protocols or changes in protocols can be accommodated by writing new values into the match engine, parser and context memories. The packet processing device can be provided in a pipelined architecture.

8 Claims, 7 Drawing Sheets

CONFIGURABLE PACKET PROCESSOR

RELATED APPLICATION

This application is a continuation-in-part of U.S. application Ser. No. 09/988,939 filed Nov. 21, 2001, now U.S. Pat. No. 7,236,492, issued Jun. 26, 2007.

TECHNICAL FIELD

This invention relates to the processing of data packets. The invention relates specifically to methods and apparatus for parsing information in a protocol stack. The invention has application, for example, in telecommunications switches, routers, network processors and components for such devices.

BACKGROUND

Modern telecommunication systems exchange data in packets. A typical packet has a header and a data payload. An Internet Protocol (IP) packet is an example of such a packet. An individual packet may have a number of different protocols. There are many circumstances in which it is desirable to process packets. In general, packet processing involves retrieving information from a packet and then performing some action on a packet. As a trivial example, packet processing might involve looking up the destination IP address in an IP packet and using the IP address to identify a port via which the packet should be forwarded to reach the destination IP address.

Packet processing systems typically must be fast enough to process packets in real time as they are received at a device. As a result, high-speed packet processors are most typically implemented in hardware. A typical packet processor comprises an application-specific integrated circuit (ASIC) which is hardwired to determine values at specific offsets within received packets and to perform certain actions on the basis of those values. ASICs can handle very large packet rates but are not very flexible. If a protocol is changed, for example, by changing the offset within a packet at which certain information is located, then the ASIC will no longer work properly. Programmable network processors are much more flexible than ASICs but lack in performance.

Programmable network processors are much more flexible than ASICs but lack in performance. Some network processors use a tree-search methodology to determine what action(s) to perform on a packet. In such a network processor, a first bit field, which typically comprises a few bits, is retrieved from the packet and used as an index to access a memory. The memory contains a value which indicates a next bit field to take (and may also specify an action to be applied to the packet). A sequence of one or more memory accesses is required to identify a final action to apply to the packet. The final action might, for example, specify whether or not the packet should be dropped, forwarded to a specific port, have a certain quality of service provided to it, and so on.

Some widely-used protocols are characterized by protocol header fields which are sparse. Such protocols are specified, at least in part, by a parameter which has a large valid range but only a few specific values of the parameter are significant. An example of such a protocol is internet protocol version 4 (IP v.4). In this widely-used protocol, packet destinations are specified by 32-bit numbers. Valid IP addresses can have any of nearly $2^{32}$ different values. In most real world packet processing situations, however, particular actions need to be taken only for a few specific IP addresses or subnets.

Each bit field retrieved from a packet being processed is typically used as an address to access a memory directly. Where the bit field contains a value of a parameter in a sparse protocol header field, (such as an IP address) then a large memory is typically required to accommodate the valid range of possible values that the parameter could have in packets being processed.

Often a device cannot accommodate a large memory internally and so the large memories must be external to the packet processing device. This slows memory access and decreases the number of memory accesses that can be made in the time allowed for processing each packet. This is a problem because it is generally necessary to make several memory accesses to arrive at the final action for a particular packet. The packet may have a protocol stack containing information regarding several protocols.

There is a need for packet processing devices and methods which can provide high throughput and yet are more flexible than hard-wired ASICs.

SUMMARY OF THE INVENTION

This invention provides a method for packet processing comprising, obtaining first information regarding a packet; using the first information as an index into a parser memory; retrieving from the parser memory an entry comprising a location in the packet of one or more protocol bits containing information relevant to a protocol associated with the packet; obtaining a match engine index; and, using the protocol bits and the match engine index as a key to retrieve a match engine entry from a match engine memory, the match engine entry comprising an action to take on the packet. The first information may comprise a channel with which the packet is associated. The term channel includes an ATM connection (or ATM channel) (which may be specified by a VPI (Virtual Path Identifier)/VCI (Virtual Channel Identifier) pair; a POS (Packet Over SONET) packet stream, and ethernet packet stream, or the like.

The match engine index may be included in the parser memory entry. The parser memory entry may comprise a context memory base address and either a location in the packet of a set of label bits or an indication that there are no label bits. If the parser memory entry includes a location of a set of label bits, the method comprises retrieving from the packet the label bits, and obtaining the match engine index comprises using the context memory base address and label bits to retrieve from a context memory an entry comprising the match engine index. If the location in the packet of a set of label bits indicates that there are no label bits, obtaining the match engine index comprises retrieving a match engine index included in the parser memory entry.

Another aspect of the invention comprises a method for packet processing in a packet processing system. The method comprises: a step for obtaining first information regarding a packet; a step for retrieving an entry corresponding to the first information from a parser memory; a step for retrieving from the packet one or more protocol bits identified by the parser memory entry; a step for retrieving from a match engine memory a match engine memory entry comprising an action to perform using a match engine key comprising a combination of the protocol bits and a match engine index; and, a step for performing the action specified in the retrieved match engine entry.

The action may comprise extracting another protocol header field from the packet. The action may be selected from the group consisting of forwarding the packet, discarding the packet, adding additional header information to the packet, associating the packet with a quality of service level, associating the packet with a security level; and extracting another protocol header field from the packet. The action may be a combination of actions. For example, adding additional header information to the packet and forwarding the packet; or associating the packet with a quality of service level and forwarding the packet; or associating the packet with a quality of service level, and extracting another protocol header field from the packet. Some actions are mutually exclusive and would not be the basis of a combined action. For example, discarding the packet and forwarding the packet are mutually exclusive.

Another aspect of the invention provides a packet processing apparatus comprising: a control logic circuit; a parser memory accessible to the control logic circuit the parser memory comprising a plurality of entries each specifying a location in a packet of one or more protocol bits and at least some of which specifying a match engine index; a match engine memory accessible to the control logic circuit, the match engine memory comprising a plurality of entries each specifying an action to be taken; and, a context memory accessible to the control logic circuit, the context memory comprising a plurality of entries each specifying a match engine index. The control logic circuit is configured to generate a match engine key by combining protocol bits of a packet identified in a parser memory entry with a match engine index from an entry of either the parser memory or the context memory, to retrieve from the match engine memory an entry corresponding to the match engine key, and to perform an action specified in the match engine entry. The control logic circuit may comprise an integrated circuit. The parser memory and match engine memory may be integrated with the control logic circuit. The context memory may be external to the control logic circuit and the control logic circuit may comprise an integrated interface to the context memory.

A further aspect of the invention provides a configurable device for processing packets. The device supports a plurality of protocols. The device comprises: a first internal memory comprising a plurality of entries; a second internal memory comprising a plurality of entries each comprising an action to be taken on the packet; logic circuitry for identifying a channel value associated with the packet, retrieving an entry from the first memory using the channel value as an index, and obtaining from the entry address information identifying a set of entries in an external context memory applicable to the channel value; logic circuitry for using the address information and one or more bit values from the packet to retrieve from the external context memory one entry from the set of entries; and, logic circuitry for using information from the one entry retrieved from the external context memory to retrieve from the second memory an action to be taken on the packet. The second memory may comprise a content addressable memory which may be a ternary content addressable memory.

A still further aspect of the invention provides a packet processing device comprising: means for retrieving first information about a received packet; means for retrieving an entry corresponding to the first information, the entry comprising a location in the packet of one or more protocol bits specifying a protocol associated with the packet and a match engine index; means for generating a match engine key; means for retrieving an action corresponding to one of a plurality of match engine entries which matches the match engine key; and, means for performing the action.

In a still further aspect of the invention there is provided a device for processing packets in which a plurality of protocols are supported, the device comprised: first and second internal memories, wherein; the first internal memory provides, based on a channel on which the packet is received, address information to access an external memory containing context information associated with the packet; and the second internal memory provides, based on matching label and index information obtained from the external memory, an action to be executed with respect to the packet. The device preferably includes, in the external memory, state information associated with the packet.

Further features and advantages of the invention are described below.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides a configurable packet processing device which uses an internal match engine to look up actions to be taken on packets being processed. The use of a match engine in the context of the invention enables one to provide flexible packet processing devices which have performance approaching that of ASICs.

Figure 1:
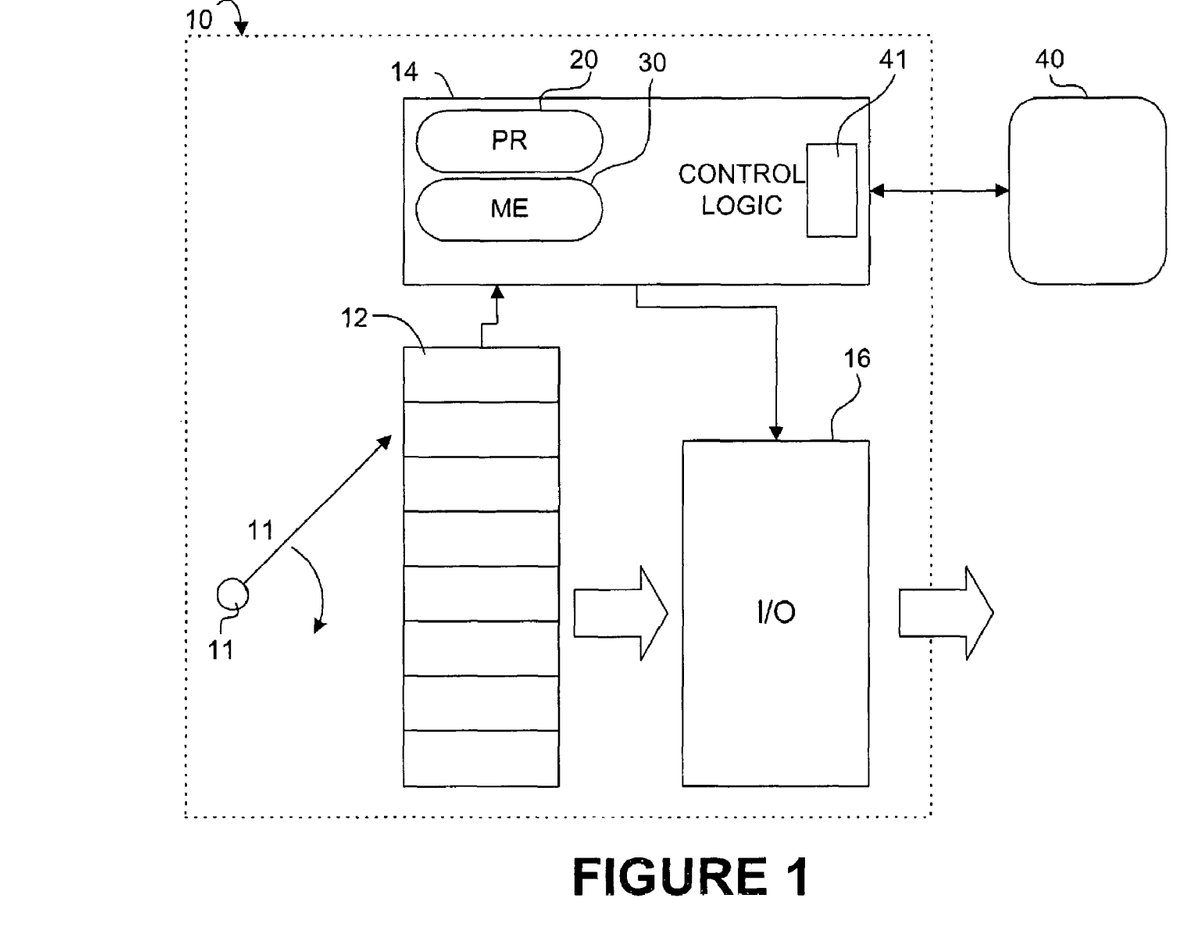
FIG. 1 is a block diagram of a packet forwarding device according to one embodiment of the invention.

FIG. 1 shows an example packet processor 10 according to the invention. Packet processor 10 has an ingress 11 at which packets 13 are received. The packets may be, for example, ATM (asynchronous transfer mode) cells, IP packets, or the like. Packets 13 are placed in a buffer 12. A control logic circuit 14 according to the invention retrieves selected bit values from each packet 13 and causes an I/O component 16 to perform a desired action on the packet being processed.

Control logic circuit 14 has access to three memories. A parser memory 20, a match engine memory 30 and a context memory 40. The contents of each of these memories is software configurable. Parser memory 20 and match engine memory 30 are preferably integrated with control logic circuit 14. Parser memory 20 may comprise random access memory (RAM) or the like. Parser memory 20 may contain a reasonably small number of entries 22, for example, 256 entries or 512 entries. Context memory 40 is a larger memory which may be located off-chip in a separate device. An interface 41 permits context memory 40 to be read by control logic circuit 14. Context memory 40 may, for example, have a capacity of 1 million entries.

Figure 2:
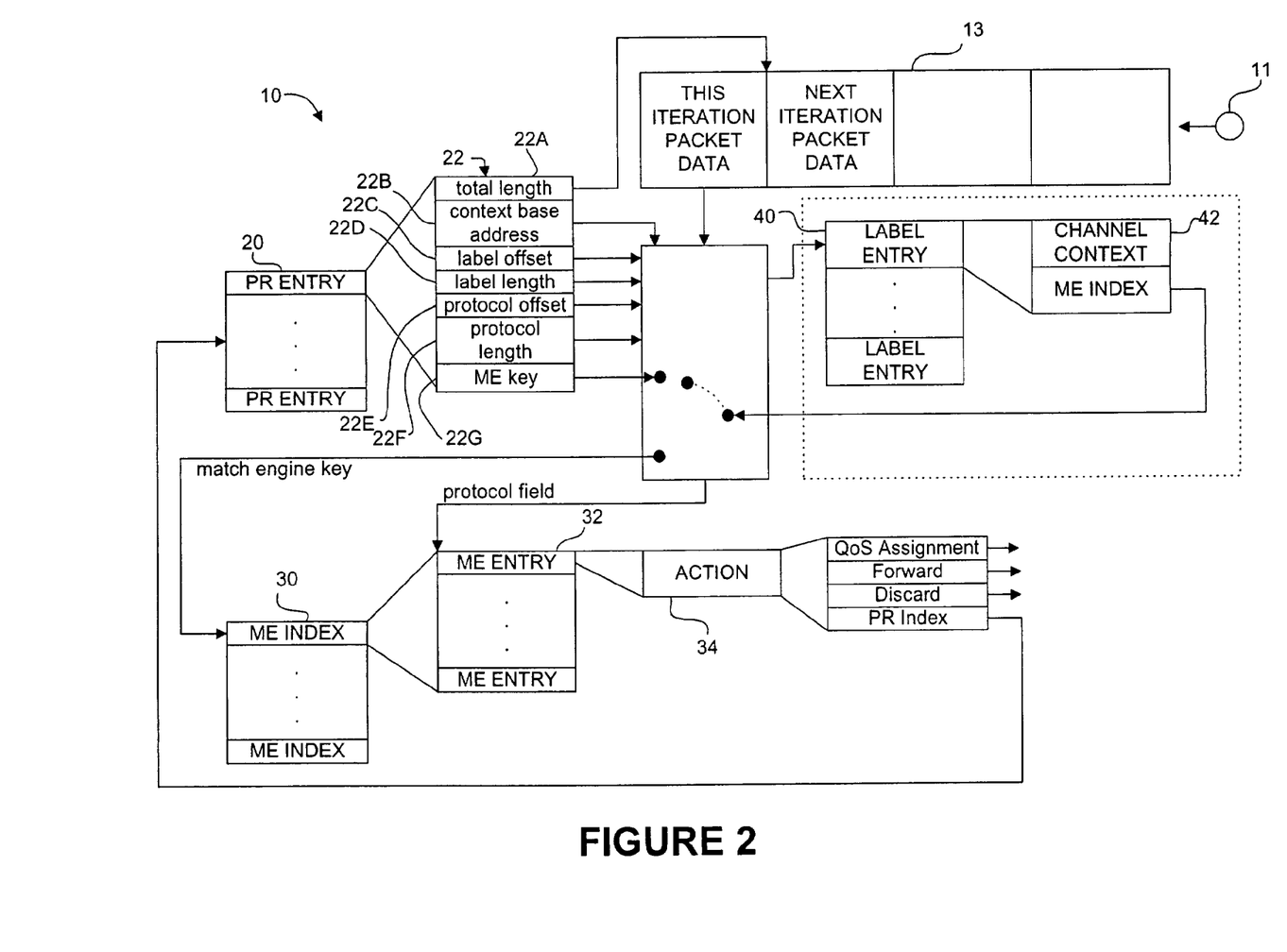
FIG. 2 is a diagram illustrating contents of memories in the packet forwarding device of FIG. 1.

FIG. 2 illustrates the contents of memories 20, 30 and 40. Each entry 22 of parser memory 20 comprises a length and offset (22C, 22D) in packet 13 of a label to extract from a packet 13 and a length and offset (22E, 22F) in packet 13 of a protocol header field to extract from packet 13. Each entry 22 also contains a match engine base 22G, a total length 22A, and a context memory base address 22B. An entry 22 can be retrieved by providing an index into parser memory 20. The index may be, for example, an integer in the range of 0 to N−1 where N is the number of entries on parser memory 20.

Entries 32 of match engine memory 30 each comprise information indicating one or both of an action to take on a packet 13 and an index into parser memory 20. An entry 32 is retrieved by providing a match engine key to match engine memory 30. Match engine memory 30 searches to see if the supplied key matches the key corresponding to any of its entries. If so match engine memory 30 returns an action to perform (which may include extracting another protocol header field from the packet 13 being processed). The action to perform may include actions such as discarding the packet, forwarding the packet to a specified output port, attaching additional header information to the packet for downstream processing, assigning a specified level of quality of service (QoS) to the packet, extracting another protocol header field from the packet, or the like.

Match engine memory 30 may operate like a ternary content addressable memory (CAM). Where this is the case, match engine 30 can ignore some portions of the match engine key in determining whether a match exists. Match engine key may comprise a "mask" portion and a "match" portion. The match portion is compared to the keys corresponding to the entries of match engine 30. The mask portion specifies portions of the key which are ignored while comparing the key to the keys corresponding to the entries of match engine 30. The mask portion may comprise, for example, a bit string having one bit corresponding to each bit of the match portion.

Match engine memory 30 may comprise a relatively small number of entries. The number is not fundamental to the invention but typical implementations of match engine memory 30 might include, for example, 128 or 256 entries. Match engine memory 30 may be implemented using flip flops and combinational logic circuits configured to determine when a supplied key matches the key for an entry of match engine memory 30 coupled with a memory (such as a RAM) which holds the information for each entry of match engine memory 30. By way of example, match engine memory 30 may comprise a set of flip-flops corresponding to each entry, comparator logic and a RAM memory in which is stored data indicating the action(s) to perform. Each set of flip flops is associated with an address in the RAM memory. The comparator logic compares a supplied match engine key to the values represented by each set of flip flops to identify any matches.

In cases where a mask is used, there may be multiple entries which match a particular match engine key. In such cases match engine memory 30 should implement suitable logic for selecting one of the matching entries. For example, the entry closest to the "top" of match engine memory 30 may be selected. Where this is done, it can be desirable to place those entries of match engine memory 30 which are likely to match an entire match engine key (with no portions excluded from consideration by a mask) toward the "top" of match engine memory 30.

In the preferred embodiment of the invention each of the match engine keys comprises a match engine index combined with one or more protocol bits retrieved from a packet 13. The combination may be achieved, for example, by concatenating the match engine index to the value(s) of the protocol bits.

Context memory 40 comprises a relatively large number of entries and may be external to packet processing device 10. Memory 40 may comprise, for example, a ZBT™ (Zero Bus Turnaround) SRAM available from Integrated Device Technology Inc. of Santa Clara, Calif. Memory 40 may be organized in any suitable way to allow entries to be retrieved within an allotted time. In the preferred embodiment of the invention, each entry of context memory 40 may be retrieved by supplying an address which comprises a label retrieved from a packet 13 added to a context base address.

Figure 3:
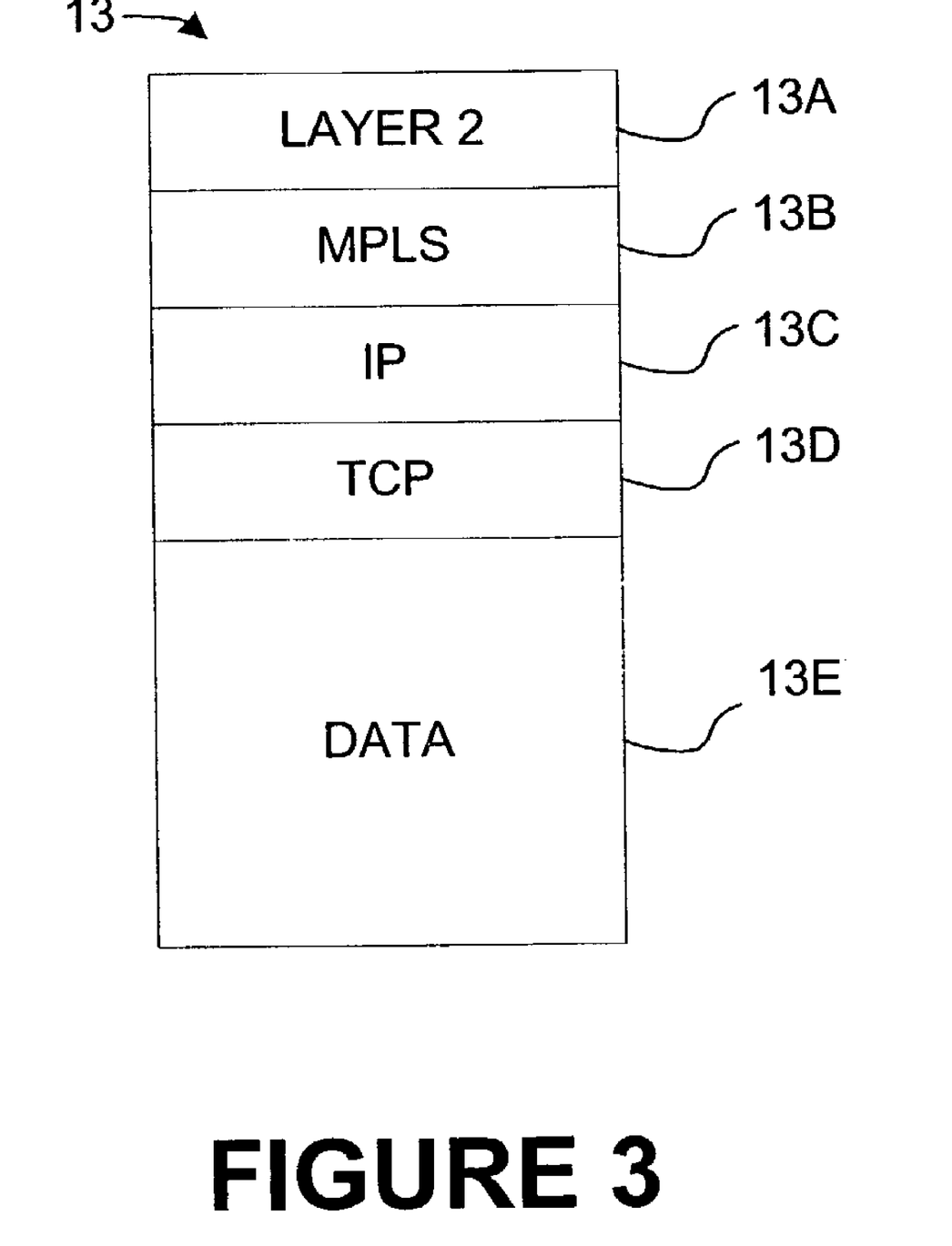
FIG. 3 is a diagram illustrating the structure of an example packet.

Each packet 13 may comprise information regarding a number of protocols. For example, FIG. 3 shows the overall structure of a packet 13 which has a level 2 header 13A (header 13A could be, for example a point to point protocol (PPP) header or the like), a MPLS (Multiprotocol Layer Switching) header 13B, an IP header 13C and a TCP header 13D in addition to a data payload 13E.

Figure 4:
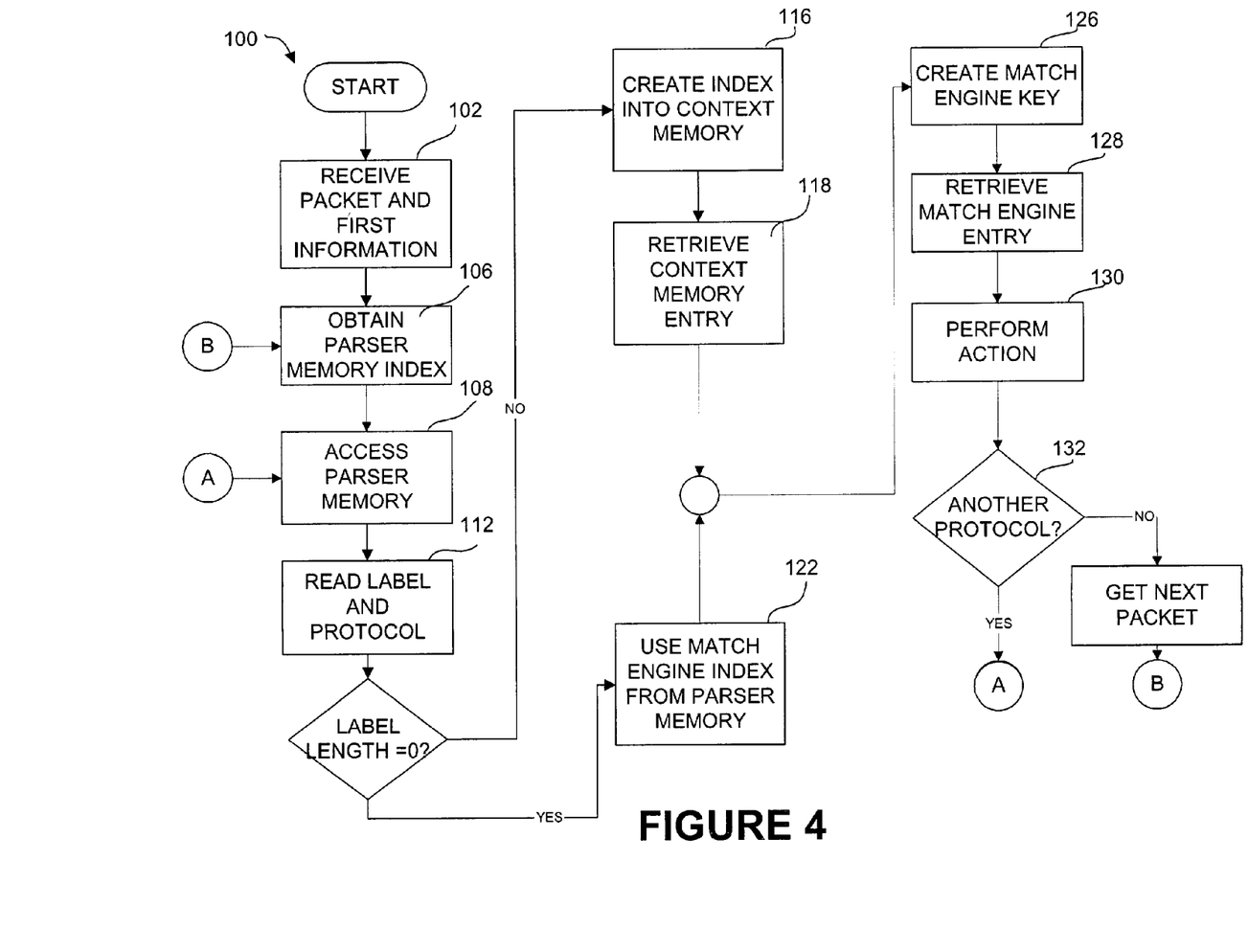
FIG. 4 is a flow chart illustrating a method for packet processing according to the invention.

FIG. 4, illustrates a method 100 according to the invention. Method 100 begins with receiving a packet (block 102) and receiving first information regarding the packet, such as a physical channel, ATM channel, port or the like on which the packet arrived at the packet processing device. Where packets 13 comprise ATM cells, the first information may comprise an ATM channel number. Method 100 continues by using the first information as an index to retrieve an entry 22 from parser memory 20 (block 108). Method 100 then retrieves from cell 13 the label and protocol bits identified by the label offset 22C and label length 22D and protocol offset 22E and protocol length 22F (block 112).

In preferred embodiments of the invention it is convenient to specify label offset 22C and protocol offset 22E relative to a "stake" which is normally set to point to the beginning of the protocol header from which protocol bits are currently being extracted from a packet. After the current protocol bit(s) have been extracted the "total length" 22A may be added to the stake so that the stake is positioned at the start of the next protocol header in the packet.

If the label length 22D in the entry 22 indexed by the first information is non-zero then method 100 creates an index into context memory 40 from the label and context base address 22B (block 116). Method 100 uses the index to retrieve an entry 42 from context memory 40 (block 118). Entry 42 includes a match engine index 42B. Entry 42 may also comprise information useful or required for performing a subsequent action on the packet being processed.

If the label length is zero then it is not necessary to use context memory 40 to obtain a match engine index. In this case, the match engine index 22G from entry 22 of protocol memory 20 is used (block 122).

As shown in FIG. 2, match engine 30 comprises a content addressable memory. The match engine index retrieved in either block 118 or 122 is combined (block 126) with protocol data from packet 13 to generate a match engine key. The match engine key is applied to match engine memory 30 to identify a match engine entry 32 (block 128). The entry 32 in match engine 30 which corresponds to the match engine key comprises information indicating one or more actions to take. The actions may include extracting information relating to another protocol from packet 13, in which case the entry 32 includes an index into parser memory 20. Method 100 performs any action specified in the match engine entry 32 (block 130). In performing the action, method 100 may use information previously retrieved from context memory 40.

If match engine entry 32 comprises a further parser memory index (as determined in block 132) then method 100 uses that parser memory index to look up an entry 22 in parser memory 20 and the process is repeated. If match engine entry 32 does not contain another parser memory index then the action identified in match engine entry 32 is a final action and processing can terminate for the packet in question upon the action specified in entry 32 being performed.

The action may be one of forwarding the packet, discarding the packet, adding additional header information to the packet, associating the packet with a quality of service level, associating the packet with a security level; and extracting one or more bits of another protocol header from the packet.

An action may comprise a combination of other actions. For example, adding additional header information to the packet and forwarding the packet; or associating the packet with a quality of service level and forwarding the packet; or associating the packet with a quality of service level, and extracting bits from another protocol header from the packet. Some actions are mutually exclusive and would not be the basis of a combined action. For example, discarding the packet and forwarding the packet are mutually exclusive.

Performing an action may require additional information. For example, where the action is to forward a packet, it may be necessary to specify an output port on which the packet will be forwarded and/or an output queue into which the packet will be placed. Where the action is to assign a level of QoS to the packet it may be necessary to assign to the packet a class of service and a drop precedence (which indicates how acceptable it is to drop the packet). The additional information required for such actions may be stored in context memory 40 and retrieved prior to the action being taken.

This invention may be embodied in a pipelined architecture wherein multiple packets are processed simultaneously. The number of steps that can be performed on each packet is a function of the amount of time available for handling each packet. For example, where packet processor 10 is processing 53 byte ATM packets which are arriving in an OC-192 data stream at a rate of 10 Gb/s then it is necessary to complete the processing of one packet approximately every 40 ns. In this example, if packet processor 10 is implemented in hardware which is clocked at 150 MHz then one packet needs to be processed every 6 clock cycles.

Figure 5:
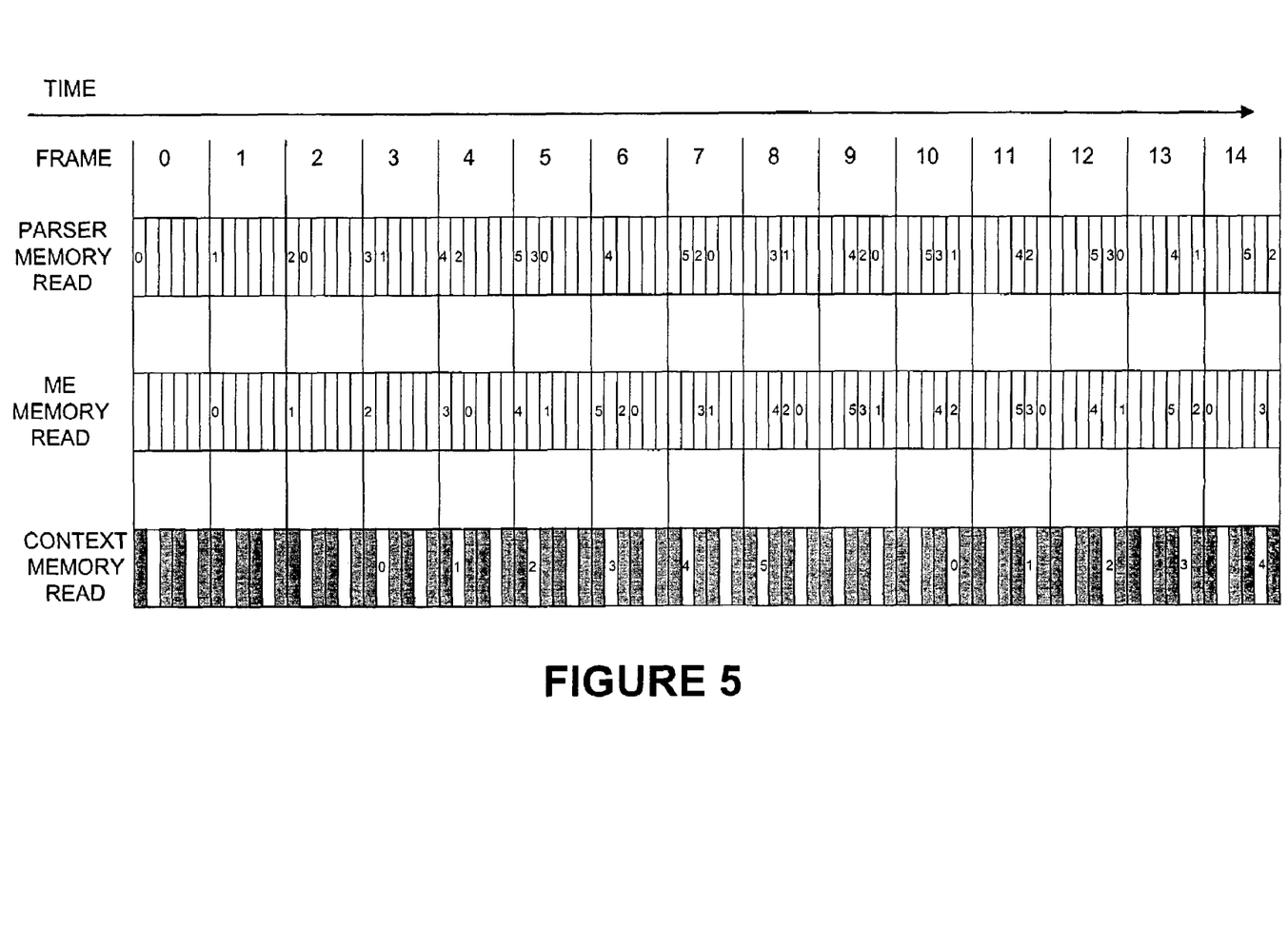
FIG. 5 is a timing diagram for a possible pipelined embodiment of the invention.

The processing of packets may be pipelined in various ways. One can define a frame as being a number of clock cycles within which packet processor 10 must be able to process a packet. In the foregoing example, a frame could comprise 6 clock cycles. In the worst case, a packet may arrive every frame. To maintain wirespeed throughput a packet must be processed every frame. One implementation of the invention uses a 15 frame pipeline as shown in FIG. 5. In this embodiment of the invention, each packet 13 proceeds through 15 processing stages. Each packet 13 moves to a next stage at the end of each frame.

FIG. 5 shows the processing for 6 packets (identified by the numerals 0 through 5). Other subsequently-received packets are not shown. All possible processing steps are shown for each of packets 0-5. Most packets having a realistic protocol stack will not require that all operations be performed. As seen in FIG. 5, this pipelined implementation makes full utilization of parser memory 20 and match engine memory 30 in the case of back-to-back minimum-sized packets. It also avoids accessing context memory 40 during the clock cycles which are shaded in FIG. 5. These clock cycles may be used for operations such as updating the contents of context memory 40.

EXAMPLE

Figures 6A, 6B:
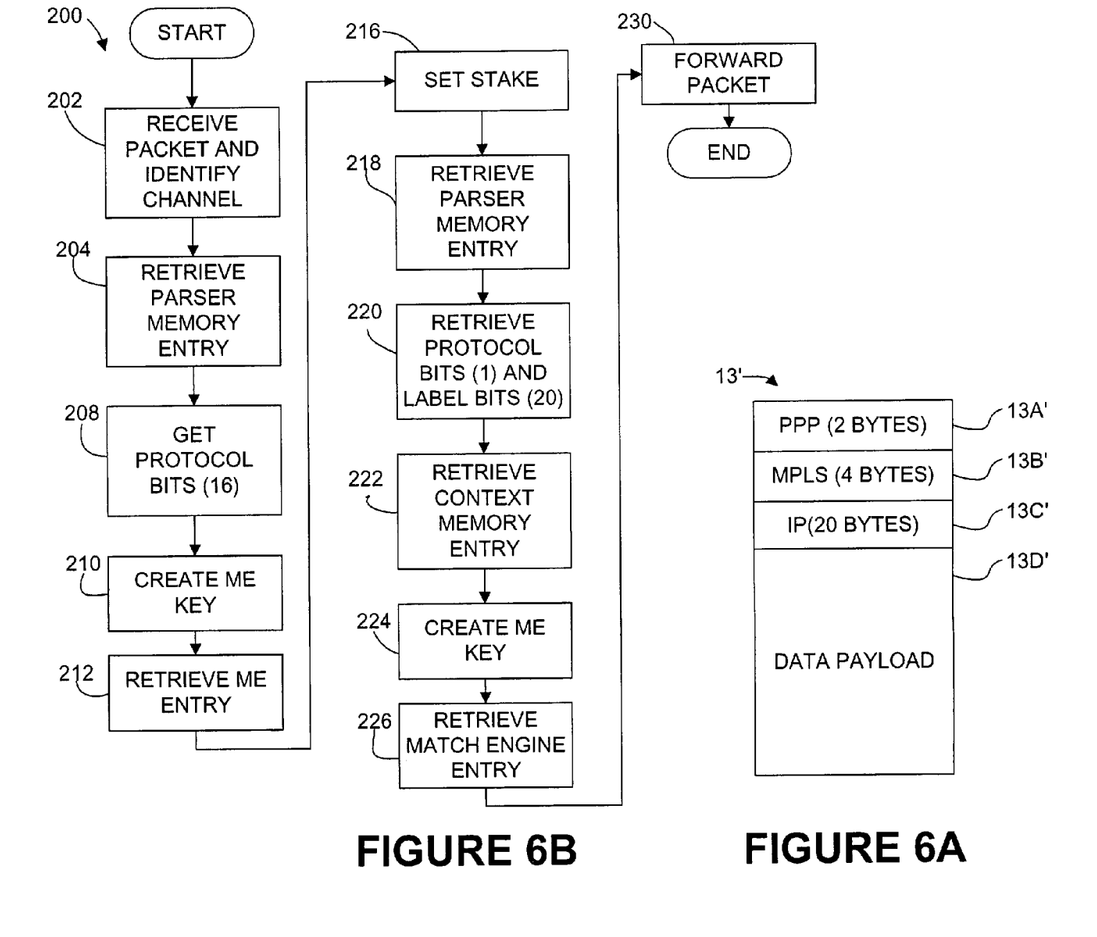
FIG. 6A is a diagram illustrating the structure of an example packet.
FIG. 6B is a flow chart illustrating how a packet processor according to the invention might process the packet of FIG. 6A; and, FIG. 7 is a diagram illustrating another embodiment of the invention.

FIG. 6A shows a packet 13' which comprises a 2 byte PPP header 13A', a 4 byte MPLS header 13B', a 20 byte IP header 13C' and a payload 13D'. FIG. 6B shows a method 200 according to which packet 13' is processed according to the invention. Packet 13' is received on a channel at a packet processing device (block 202). The channel is a channel assigned to PPP packets. The packet processing device first uses the channel number as an index into parser memory 20. The index results in the retrieval of an entry 22 in parser memory 20 which is relevant to the protocol PPP(1) (block 204). The entry 22 contains the following information:
total length=16 bits;
context base address=N/A
label offset=N/A
label length=0
protocol offset=0
protocol length=16 bits
ME index=PPP(1).

Packet processor 10 therefore retrieves the first 16 bits (i.e. all of PPP header 13A' from packet 13' (block 208). Packet processor 10 creates a match engine key by concatenating these bits with the ME index PPP(1) (block 210) and supplies the resulting match engine key to match engine memory 30 (block 212). In this example, the match engine key matches the match engine entry for MPLS. Match engine memory 30 returns an index MPLS(2) to an entry in parser memory 20 corresponding to the MPLS protocol. This indicates that the action to be taken on packet 13' is to extract information relating to another protocol. If the match engine key had not matched this entry of match engine memory 30 then match engine 30 may have returned a different action to be performed on packet 13'. Packet processor 10 sets a stake to the "total length" so that label and protocol offsets for the next protocol can be measured from the stake (block 216).

Packet processor 10 uses the index MPLS(2) to retrieve another entry from parser memory 20 (block 218). In this case the resulting entry comprises the following information:
total length=32 bits;
context base address=MPLS base
label offset=0
label length=20 bits
protocol offset=23 bits
protocol length=1 bits
ME index=MPLS(2)

Since the label length field contains a non-zero value, packet processor 10 retrieves both the 20 bit label and a 1-bit protocol from packet 13' (block 220). As the stake is located at the beginning of MPLS header 13B' and the label offset is 0, the retrieved label is the first 20 bits of MPLS header 13B'. Packet processor 10 then requests the entry from context memory 40 which corresponds to the MPLS base value added to the retrieved label (block 222).

Packet processor 10 receives from context memory 40 a match engine index MPLS(2). Together with the match engine index, packet processor 10 retrieves from context memory 40 information relating to actions that may be taken on the packet, such as forwarding the packet. Packet processor 10 then combines the protocol bits retrieved above with the match engine index (block 224) and supplies the resulting key to match engine memory 30 (block 226). In this case the protocol bit comprises the "S" bit in the MPLS header and has a value of 1, which indicates that MPLS header 13B' is the last MPLS header for packet 13'. Match engine memory 30 returns the action "forward packet". Packet processor 10 then forwards packet 13' as an IP packet using information in IP header 13C' and additional information retrieved from context memory 40 (block 230).

Packet processor 10 is preferably implemented as a "hard-wired" ASIC. New protocols and changes to existing protocols may be accommodated by simply changing the contents of parser memory 20, the keys and contents of match engine memory 30 and the contents of the off-chip context memory 40. Thus, a packet processor 10 according to the invention retains the speed advantages of ASICs while remaining configurable.

The nature of packet processing requires that many memory accesses be taken in order to arrive at the final packet actions as there can be many protocols in the stack of one packet. If each bit field is used to access memory directly (i.e. as an address), for sparse protocols large memories are required. These large memories often must be stored in memory external to the device resulting in performance limitations because of the limited number of accesses that can be made in each packet time.

In accordance with a further embodiment of the present invention these problems can be overcome by using internal content addressable memory (CAM) and RAM memories for sparse protocols such as PPP. Instead of providing 64 k of memory for the 16 bit PPP protocol when only a few values are important the values can be stored internally in a CAM. Only protocols which are densely populated are stored in external memory. This allows a significant performance improvement for many common protocol stacks as internal memories can be accessed much more frequently than external memories. In addition, the next leaf information is not stored for each leaf of the tree further reducing memory requirements.

Figure 7:
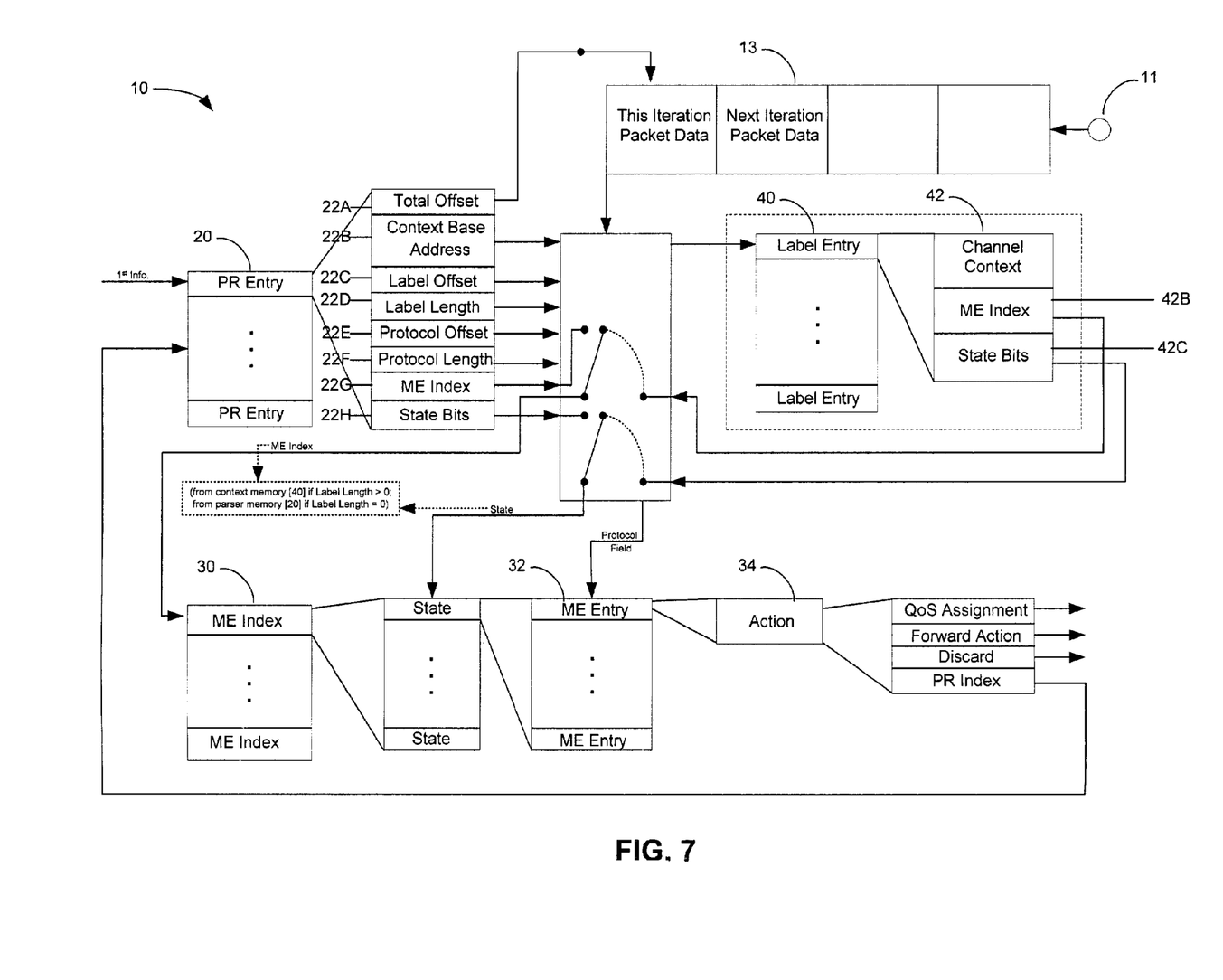

In order to handle a stateful protocol such as PPP a different match engine index for every possible state combination is required which means the number of entries in the match engine memory for that protocol and consequently the size of the match engine memory becomes very large. In this embodiment, as shown in FIG. 7, entry 42 comprises state bits 42C to adapt to stateful protocols.

Stateful protocols require a different match engine index for every possible state combination. This means that the number of entries in the match engine memory becomes very large; consequently, the size of the match engine memory becomes very large as well. For example, point-to-point protocol (PPP) has 16 states—keep MPLS only, keep IP only, keep OSINL only, keep other protocols only, or keep some combination of the aforementioned protocols—which means that PPP requires 16 times as much match engine memory as other protocols.

By including state bits 42C in entry 42—to represent each case of a stateful protocol—a larger match engine memory need not be the case. The match engine key can be formed from the protocol label combined with the match index and the state bits read from the context memory 40. For example, by having four bits represent the 16 states of PPP, and by concatenating the 16 different values of the four state bits to the same match engine index, 16 different new ones are created; therefore, a PPP can be handled without augmenting the match engine memory. The state bits will be part of every protocol lookup until the next channel context lookup, when they would be replaced with new bits. As shown in FIG. 7, state bits 22H can also be associated with the first internal memory 20. As with the ME index the state bits come either from this internal memory or from the external memory 40 depending on whether or not an external lookup was done.

Where a component (e.g. an assembly, device, memory, etc.) is referred to above, unless otherwise indicated, reference to that component (including a reference to a "means") should be interpreted as a reference to any component which performs the function of the described component (i.e. is functionally equivalent to the described component), including components which are not structurally equivalent to the disclosed structure which performs the function in the illustrated exemplary embodiments of the invention. Where a step in a method is referred to above, unless otherwise indicated, reference to that step should be interpreted as a reference to any step which achieves the same result as the step (i.e. is functionally equivalent to the described step), including steps which achieve a stated result in different ways from those disclosed in the illustrated exemplary embodiments of the invention.

As will be apparent to those skilled in the art in the light of the foregoing disclosure, many alterations and modifications are possible in the practice of this invention without departing from the spirit or scope thereof. For example:

parser memory 20 could be a portion of the same RAM memory which is used to store the data returned by match engine memory 30. It is preferable, however, to provide separate memories to facilitate being able to look up data in both parser memory 20 and match engine memory 30 in the same clock cycle.

Accordingly, the scope of the invention is to be construed in accordance with the substance defined by the following claims.

The invention claimed is:

1. A method for controlling a packet processor having an ingress, a control logic circuit, a parser memory, a context memory, and a match engine memory to perform a packet processing, comprising:

receiving a packet having a plurality of bits, at the ingress of the packet processor;

retrieving by the control logic circuit certain of the plurality of bits to obtain a first information regarding the packet;

retrieving from the parser memory, based on said first information, an entry comprising a context memory base address and a label bit information, the label bit information indicating whether or not label bits specifying a protocol associated with the packet exist and, if indicating label bits exist, indicating a location in the packet of one or more of the label bits;

if said retrieved label bit information indicates said label bits exist, retrieving from the packet the label bits based on said location;

retrieving from the context memory a match engine index, based on the memory base address and, if said retrieved label bit information indicates said label bits exist, further based on said retrieved label bits;

forming a key comprising said match index and, if said label bit information indicates said label bits exist, said key comprising said match key index combined with the retrieved label bits;

searching the match engine memory to obtain a match engine entry comprising an action for the packet processor to take on the packet, based on said key; and executing an action on the packet processor, pertaining to the packet, based on the match engine entry.

2. The method of claim 1 wherein, if said label bit information indicates that no label bits exist, the match engine index comprises the context memory base address included in the parser memory entry.

3. The method of claim 2 wherein the match engine memory comprises a content-addressable memory.

4. The method of claim 1 wherein obtaining the first information comprises identifying a channel with which the packet is associated.

5. A packet processing device comprising:
   means for retrieving a first information about a received packet;
   means for retrieving an entry corresponding to the first information, the entry comprising a location in the packet of one or more protocol bits specifying a protocol associated with the packet and a match index;
   means for generating a match engine key;
   means for performing an action corresponding to one of a plurality of match engine entries which matches the match engine key;
   means for performing the action; and
   means for determining from the entry whether to retrieve an entry from an external context memory and, means for retrieving an entry from the external context memory, wherein the means for generating the match engine key is able to generate the match engine key using information in the entry from the external context memory.

6. The packet processing device of claim 5 wherein the first information comprises an ATM channel associated with the packet.

7. The packet processing device of claim 6 wherein the means for performing the action included means for forwarding the packet to another packet processing device.

8. The packet processing device of claim 5 wherein the means for generating a match engine key, the means for retrieving an action and the means for retrieving an entry from the external context memory are incorporated on a single integrated circuit.

* * * * *

UNITED STATES PATENT AND TRADEMARK OFFICE
CERTIFICATE OF CORRECTION

PATENT NO.       : 7,580,408 B2                                     Page 1 of 1
APPLICATION NO.  : 10/465236
DATED            : August 25, 2009
INVENTOR(S)      : Chad William Kendall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this

Fourteenth Day of September, 2010

David J. Kappos
*Director of the United States Patent and Trademark Office*